United States Patent [19]

Strem et al.

[11] 4,257,366

[45] Mar. 24, 1981

[54] FUEL FEED SYSTEM AND METHOD FOR GASOLINE BURNING INTERNAL COMBUSTION ENGINE

[75] Inventors: Robert C. Strem; Richie C. Strem, both of Newcastle; John H. Eberle, Colfax, all of Calif.

[73] Assignee: Omnewtronics, Inc., Carson City, Nev.

[21] Appl. No.: 6,355

[22] Filed: Jan. 25, 1979

[51] Int. Cl.³ .............................................. F02M 31/00
[52] U.S. Cl. .................................................. 123/554
[58] Field of Search ........ 123/122 R, 122 AC, 122 B, 123/122 C, 122 D, 122 E, 122 F, 133, 34 R, 34 A

[56] References Cited

U.S. PATENT DOCUMENTS

| | | | |
|---|---|---|---|
| 3,667,436 | 6/1972 | Reichelm | 123/122 R X |
| 4,106,453 | 8/1978 | Burley | 123/122 B X |
| 4,167,165 | 9/1979 | Finlay et al. | 123/122 AA |

*Primary Examiner*—Harry N. Haroian
*Attorney, Agent, or Firm*—Flehr, Hohbach, Test, Albritton & Herbert

[57] ABSTRACT

A system for feeding gasoline fuel into a gasoline burning internal combustion engine is disclosed herein along with its method of operation. In accordance with this system and method, gasoline fuel in a liquid state is supplied to a vaporization chamber where it is vaporized and thereafter directed to the engine for combustion therein. In order to prevent this vaporized fuel from condensing back to a liquid, a supply of air is preheated to a controlled predetermined temperature and directed into the vaporization chamber where it combines with the vaporized fuel and is passed with the latter to the engine.

9 Claims, 7 Drawing Figures

FUEL FEED SYSTEM AND METHOD FOR GASOLINE BURNING INTERNAL COMBUSTION ENGINE

The present invention relates generally to gasoline burning internal combustion engines and more particularly a system for and method of feeding gasoline fuel into an engine of this type. This system is an improvement over applicant's co-pending applications Ser. No. 862,947 filed Dec. 21, 1977 and entitled ASSEMBLY AND METHOD OF VAPORIZING LIQUID GASOLINE FUEL AND SYSTEM, Ser. No. 856,494 filed Dec. 1, 1977, entitled ASSEMBLY AND METHOD OF VAPORIZING LIQUID GASOLINE FUEL AND SYSTEM, and Ser. No. 843,799 filed Oct. 20, 1977, now U.S. Pat. No. 4,178,897 entitled SYSTEM AND METHOD OF FEEDING GASOLINE FUEL INTO AN INTERNAL COMBUSTION ENGINE.

The co-pending applications just recited provided a discussion of the drawbacks in conventional fuel feed techniques in internal combustion engines and reference is made thereto. These applications also discussed various systems and methods for improving the way in which fuel is fed to such an engine. Broadly, these co-pending applications disclose a fuel feed technique whereby gasoline fuel in its liquid state is supplied to a chamber where it is vaporized and thereafter directed to the engine. Specific ways in which this is accomplished are also disclosed. In a preferred embodiment, as disclosed in the most recently filed co-pending application, Ser. No. 862,947, the system does not rely on heat to vaporize the fuel but rather a specific assembly of vaporization plates and a stream of air.

While the vaporization assembly just mentioned functions in a satisfactory manner for its intended purpose, that is, to vaporize liquid gasoline, and while the combustion of this vaporized gasoline in the engine rather than liquid gasoline is highly desirable, there is nevertheless room for improvement in the various approaches described in the co-pending applications. For example, in the approach taken in application Ser. No. 862,947, liquid fuel is vaporized on appropriate plates within a vaporization chamber. A stream of air from the ambient surroundings and ambient temperature is directed through the vaporization chamber where it is saturated with the vaporized fumes and thereafter directed to the engine, specifically to its intake manifold. A specific drawback in this approach resides in the possibility that some of the saturated fumes (vaporized fuel) may condense back to liquid fuel between the time it leaves the vaporization chamber and the time it enters the intake manifold of the engine for combustion therein. This in turn reduces the overall efficiency of the engine.

As will be seen hereinafter, the approach taken in accordance with the present invention at least reduces and preferably eliminates the drawback just described by preheating the carrier air before the latter enters the vaporization chamber and is saturated by the vaporized fuel. As will also be seen, the overall vaporization assembly designed in accordance with the present invention is significantly different than the assembly described in the last mentioned co-pending application but nevertheless utilizes vaporization plates rather than heat to vaporize the liquid fuel. Other differences between the approach taken herein and those approaches described in the co-pending applications will also become apparent hereinafter.

In view of the foregoing, one object of the present invention is to provide an efficient and yet uncomplicated and economical system for feeding gasoline fuel into a gasoline burning internal combustion engine.

Another object of the present invention is to provide a system which improves upon gasoline usage in a gasoline burning internal combustion engine.

Still another object of the present invention is to provide a system for feeding gasoline fuel into a gasoline burning internal combustion engine, which system does not require a carburetor but rather feeds directly into the intake manifold of the engine, thereby eliminating the various disadvantages resulting from the utilization of a carburetor.

Yet another object of the present invention is to provide a fuel feed system which carries out the previous objects by first vaporizing liquid gasoline fuel before the fuel is introduced into the engine.

Still another object of the present invention is to provide a system of the last-mentioned type wherein the liquid fuel is vaporized without the direct application of heat.

Yet another object of the present invention is to minimize and preferably eliminate the possibility that the vaporized fuel in the last-mentioned system condenses back to a liquid state before reaching the engine.

Still another object of the present invention is to provide a fuel feed system of the last-mentioned type having an improved vaporization assembly.

A further object of the present invention is to provide a method of feeding fuel into a gasoline burning internal combustion engine, which method includes the various objectives set forth above.

These objects, as well as other objects and features, are achieved by the particular system and method of the present invention as will become apparent hereinafter. In this regard, for purposes of description, both the present system and method will be described in relation to an internal combustion engine used for powering a vehicle, for example an automobile. However, it is to be understood that the present invention is equally applicable where the engine is provided for powering or driving other apparatus. Moreover, fuels other than gasoline may be utilized by the present invention and for purposes of the present invention would be equivalent so long as they function in an internal combustion engine in the same manner as gaoline and, of course, so long as they can be reduced to a vapor state from a liquid state in the manner to be described hereinafter. Regarding this latter point, it should be clear that diesel fuel, for example, would not be such a fuel.

In accordance with the present invention, gasoline fuel is supplied in a liquid state from a supply tank to a vaporization chamber where it is vaporized and thereafter into the engine in its vaporized state for combustion therein, as generally described in the previous cited co-pending applications. However, in the technique disclosed herein, a supply of air preheated to a controlled predetermined temperature is also provided and directed into the vaporization chamber wherein it is saturated with the vaporized fuel (fumes). This combination of vaporized fuel and preheated air is thereafter directed to the engine and, in this regard, the primary if not sole purpose for heating the carrier air is to prevent the vaporized gasoline carried thereby from condensing to a liquid state before reaching the engine.

Figures 1, 5, 5A, 6, 7:
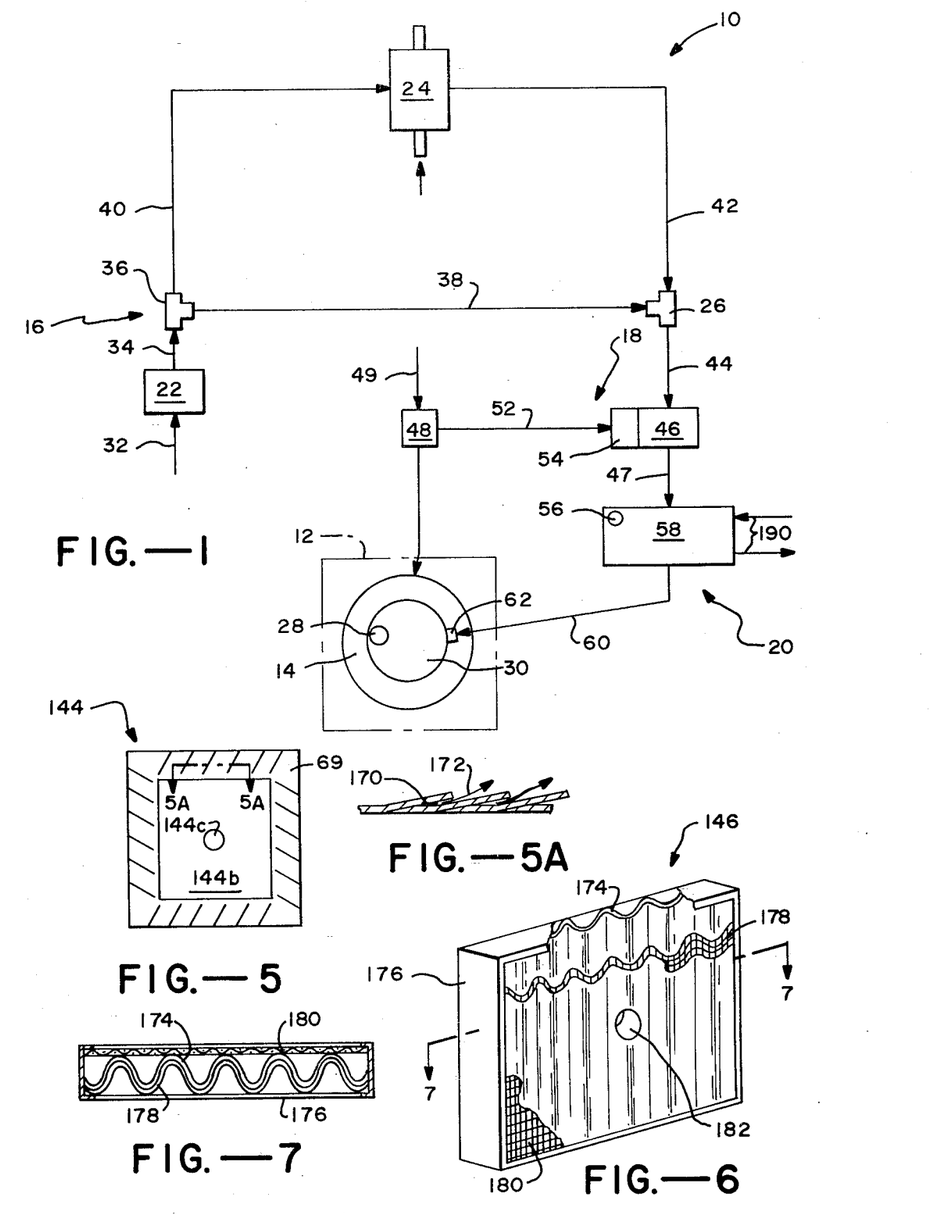
FIG. 1 is a block diagram of a system designed in accordance with the present invention and provided for feeding gasoline fuel into a gasoline burning internal combustion engine.
FIG. 5 is plan view of a circulation fin comprising part of the assembly illustrated in FIG. 4.
FIG. 6 is a perspective view of a vaporization plate comprising part of the assembly illustrated in FIG. 4.
FIG. 7 is a sectional view of the vaporization plate illustrated in FIG. 6, taken generally along line 7—7 in FIG. 6.

Turning now to the drawings, wherein like components are designated by like reference numerals throughout the various figures, attention is first directed to FIG. 1. This figure illustrates an overall system 10 which is designed in accordance with the present invention and which is provided for feeding gasoline fuel into a gasoline burning internal combustion engine, generally indicated by dotted lines at 12. The engine itself may be of any conventional type which burns gasoline fuel and which would include all of the required components to make it function properly including internal components, for example an intake manifold (not specifically shown), and external but cooperating components such as a carburetor 14, a fuel pump and cooperating throttle (not shown) and the like. All of these components are conventional and, hence, are either not shown herein at all or only generally. In this regard, for reasons to be discussed hereinafter, it is important to note that engine 12 is of the type which draws a vacuum through its manifold when in operation. The level of this vacuum depends upon the power developed by the engine, that is, it is inversely proportional to power developed by the engine. Therefore, during an idle condition (low power), the level of vacuum is high, for example 21 inches of mercury. At half power, the vacuum is at a low level, for example 7 inches of mercury, and at full power the vacuum is at a minimum level, for example no vacuum at all.

Having described or mentioned the conventional features of engine 12 which are necessary to a full understanding of the present invention, attention is now directed to the various components making up system 10 which, as stated, is designed in accordance with the present invention. In this regard, some of these components are themselves conventional and therefore will not be described in detail while others are not conventional and will be shown in more detail in later figures. For purposes of description, system 10 is divided into three sections 16, 18 and 20. As will be seen hereinafter, section 16 provides a supply of air which is preheated to a controlled predetermined temperature and section 18 provides a metered supply of gasoline fuel in liquid state from a supply tank either directly to engine 12 for conventional combustion therein or to section 20. This latter section combines the liquid fuel and preheated air and causes the fuel to vaporize and saturate the air for combustion in engine 12.

Referring specifically to section 16 of system 10 as shown in FIG. 1, this section includes an air filter 22, a heat exchanger assembly 24 and an electrically actuated solenoid valve 26. It also includes a temperature sensor 28 and associated circuitry for controlling valve 26 in a manner and for reasons to be described hereinafter. For the moment, it should suffice to say that the temperature sensor 28 is located on top of a stainless steel cover 30 which is provided over carburetor 14, replacing its conventional air filter. All of the components making up section 16 of system 10 thus far described, with the exception of heat exchanger assembly 24, are conventional and will not be further described from a structural standpoint. The structural details of assembly 24 will however be described hereinafter with respect to FIG. 2.

As stated above, section 16 of system 10 provides a supply of air which is preheated to a controlled predetermined temperature. This is carried out by first drawing in a stream of ambient air at ambient temperature (for example 70° F.) into and through air cleaner 22, as indicated by arrow 32 which actually represents a suitable conduit or air hose. As indicated by arrow 34 (actually another suitable air hose), the filtered air stream is directed into a suitable tee connection 36 for dividing the filtered stream between two paths as indicated by the arrows or air hoses 38 and 40. The stream 38 is applied directly to one input of valve 26 which may or may not be opened to stream 38 as will be discussed below. The other stream 40 passes into heat exchanger assembly 24 and thereafter out of the assembly as indicated by arrow (hose) 42. As the stream of air passes through assembly 24 it is heated, preferably utilizing the heat from the exhaust fumes generated during the operation of engine 12, as will be discussed hereinafter. In any event, this preheated stream of air, now indicated at 42 (another hose) is directed to an alternate inlet of valve 26 which also may or may not be opened.

A stream of air indicated by arrow (hose) 44 passes from the outlet of valve 26 and is preheated to a controlled temperature. More specifically, valve 26 operates rapidly between a deenergized state for passing hot air stream 42 and an energized state for passing cold air stream 38, depending upon the temperature of the vaporized fuel carrier air stream entering the engine which stream will be discussed hereinafter. For the moment, it should suffice to say that the temperature of this latter stream is monitored by previously recited temperature sensor 28 located on the previously described cover 30. More specifically, the valve, in response to conventional control circuitry including sensor 28, is rapidly energized and de-energized to maintain the stream at a predetermined temperature, specifically between about 140°, 180° F. in a preferred embodiment and most preferably about 150° F. Obviously, should the stream fall below the predetermined temperature, a greater proportion of the heated stream will be passed by valve 26 as compared to the ambient stream. On the other hand, should the combination stream exceed the predetermined temperature, a greater proportion of ambient air will be passed through the valve. While it is necessary to the present invention to provide a preheated stream of air for carrying the vaporized fuel, as stated previously, it is also important not to overheat this air. If air with vapor is overheated the combustibility of the mixture does not burn in the cylinder evenly causing loss of power.

From the foregoing description of section 16, it should be apparent that some means must be provided for producing the previously described air streams. While a suitable pump means could be utilized, in an actual working embodiment, the streams of air thus far described with respect to section 16 continue as a single stream through section 20, as will be seen hereinafter, and this stream ultimately passes into the engine through its intake manifold. It is the vacuum created in the intake manifold during operation of engine 12 which is responsible for creating the flow of air described above. In any case, with regard to section 16, the end result is to provide a stream of preheated air (stream 44) having a temperature within a predetermined range, preferably between 150° F. and 180° F., as regulated by valve 26, temperature sensor 28 and its associated circuitry. The way in which this stream is utilized will be discussed hereinafter. For the moment, it should suffice to say that it is directed into an air/fuel mixing chamber 46 which, as will be seen hereinafter, comprises part of section 20.

Having described section 16 of system 10, attention is now directed to section 18, which serves to meter liquid gasoline fuel into air/fuel mixing chamber 46 or to direct it to carburetor 14 of engine 12, depending upon the temperature of the engine. More specifically, section 18 includes a fuel divert valve 48 which is an electrically actuated solenoid valve in a preferred embodiment. This valve has its input connected directly to the fuel pump as indicated by arrow 49 and one output is connected into carburetor 14 in a conventional manner, as indicated by arrow 50. The other output of valve 48, indicated by arrow 52, is connected to the input of a metering device 54 which also comprises part of section 18 and which will be described in detail hereinafter with respect to FIG. 3. A temperature sensor 56 mounted on a vapor box comprising part of section 20 (to be described hereinafter) is also part of section 18 and, with associated conventional circuitry (not shown), operates valve 48.

So long as the temperature at the vapor box remains above a certain level, for example 180° F. which is an indication that the engine is warm, valve 48 remains in a deenergized state. However, when the engine is cold, thereby causing the temperature of the vapor box to drop below the temperature just recited, valve 48 is energized. In this regard, the conventional circuitry associated with this valve and sensor 56 includes a supply of power (not shown) to the fuel divert valve and means for connecting the valve to its source of power or disconnecting the two, depending on the temperature of the vapor box as sensed by sensor 56. So long as the engine is warm and valve 48 remains deenergized, liquid fuel from the fuel pump is directed to metering device 54 so that section 20 functions in the overall system in the manner to be described. However, if the engine is cold, it is desirable to bypass section 20 and feed liquid gasoline into the carburetor in a conventional manner. Hence, under these circumstances, the fuel divert valve is preferably automatically energized to bypass section 20 and divert the liquid fuel directly into the carburetor. While not shown, system 10 may include suitable means for overriding the temperature sensor and operating the fuel divert valve manually for either bypassing section 20 when the engine is warm if this is desired or for utilizing section 20 even though the engine may be cold.

As will be seen hereinafter, with fuel divert valve 48 in its deenergized state, metering device 54 serves to meter a predetermined amount of fuel into mixing chamber 46, depending upon the vacuum level within the intake manifold of engine 12. As will also be seen, this liquid fuel is mixed with the incoming preheated stream of air 44 which moves into and through the mixing chamber at a flow rate also proportionate to the vacuum level in the intake manifold.

Attention is now directed to section 20 of system 10 which, as stated, includes air/fuel mixing chamber 46 and which serves to (1) mix the incoming liquid fuel and preheated air, actually atomizing the fuel in the latter, and (2) eventually vaporize the liquid fuel so that the latter can saturate the air and be fed directly into engine 12 for combustion thereby. Mixing chamber 46 may itself be conventional, merely comprising a housing, actually a section of a conduit as will be seen with respect to FIG. 3, for receiving the preheated air and metered fuel at a specific juncture. The output of this chamber provides a combination air/fuel stream indicated by arrow 47. As stated previously, section 20 of system 10 also includes a vapor box or vaporization assembly which is generally indicated at 58 in FIG. 1. This assembly is not conventional and will be discussed in detail with respect to FIGS. 4–7. As will be seen then, assembly 58 serves to receive the combination of preheated air and liquid fuel for vaporizing the latter. This combination of heated air and vapor, the latter actually saturating the air, is directed into engine 12 for combustion therein through an appropriate opening in the previously recited cover 30 as indicated by arrow 60. From a functional standpoint, this combination of air and vaporized fuel bypasses the carburetor and is fed directly into the engine through the intake manifold as discussed in the previously recited co-pending applications. In a preferred embodiment, the opening provided in cover 30 for receiving the combination air and fuel is covered with a 100 mesh screen 62 so that if the engine backfires, the mesh screen will prevent this backfire from backing into the vapor box. However, as will be seen hereinafter with respect to FIG. 3, metering device 54 significantly reduces any possibility of backfiring.

Having described the various sections of system 10, it should be apparent that engine 12 may be operated in either a conventional manner utilizing liquid gasoline fuel which is atomized in the carburetor or by vaporized gasoline fuel which is carried into the engine through mesh screen 62 and the engine's intake manifold from the output of vapor box 58, as indicated by previously recited arrow 60. Systems which provide vaporized gasoline fuel for powering a gasoline burning combustion engine are, of course, disclosed in the previously recited co-pending applications and to that extent system 10 is similar thereto. However, unlike these previously described systems, the vaporized gasoline fuel in system is carried from the vapor box 58 to the engine in a stream of preheated air at a controlled temperature so as to reduce the possibility of condensation of the vapor before reaching the engine. Moreover, many of the particular components making up system 10, as will be described hereinafter, and the way in which these components cooperate with one another to produce the preheated stream of air and vaporized fuel are different than the previously described system.

Figure 2:
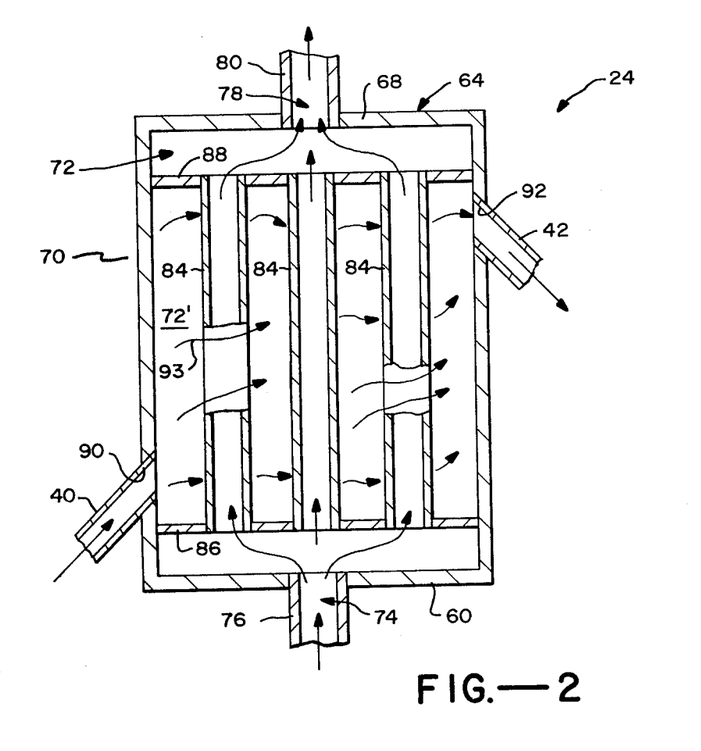
FIG. 2 is a diagrammatic illustration, in cross-section, of an assembly which comprises part of the system illustrated in FIG. 1 and which is provided for preheating a supply of ambient air.

Turning now to these specific components, attention is first directed to FIG. 2 which shows previously recited heat exchanger assembly 24 in detail. This assembly includes an outer steel housing 64 which includes opposite end walls 60 and 68 joined by side walls 70 and which defines an internal chamber 72. End wall 60 includes an inlet opening 74 which is placed in communication with the free end of an exhaust pipe 76 connected into engine 12 in a conventional manner for exhausting the exhaust fumes generated during operation of the engine. The other end wall of housing 64 includes an outlet opening 78 joining one end of a separate exhaust pipe section 80. During operation of engine 12, hot exhaust fumes enter chamber 72 through exhaust pipe 76 and inlet 74 and leave the chamber through outlet 78 and exhaust pipe section 80. However, between these entry and exit points, assembly 24 includes a subassembly for isolating the fumes from a section 72' of chamber 72. As will be seen hereinafter, this allows previously described ambient air stream 40 to pass through the chamber section and be heated by the exhaust fumes without being contaminated by the latter.

As seen in FIG. 2, subassembly includes a plurality of open ended tubes 84 which extend the length of chamber subsection 72' and which are mounted therein by two support plates 86 and 88. Support plate 86 extends entirely across chamber 72, inwardly spaced from end wall 60 of housing 64 and, in a like manner, support plate 88 extends entirely across the chamber, inwardly spaced from end wall 68. These two support plates define the longitudinal extent of chamber subsection 72. The support plate 86 is fixedly connected by means of welding or other suitable means to the front ends of tubes 84 and plate 88 is fixedly connected in a similar way to the back ends of these tubes. Both plates include openings into the tubes so that when the exhaust fumes from engine 12 first enter chamber 72, these fumes pass into the front ends of tubes 84 and thereafter through the tubes and out their back ends to the ambient surroundings through exhaust pipe section 80. As stated previously, the heat from these exhaust fumes is used to heat the stream of air 40. Accordingly, the tubes 84 are constructed of stainless steel or other heat conductive material.

Ambient air stream 40 (inciated by the hose connection) enters chamber section 72' through a cooperating opening 90 in side wall 70 near end wall 66 and it leaves the chamber section as air stream 42 (again indicated by the hose connection) through a cooperating opening 92 in side wall 70, on the opposite side of opening 90 and near end wall 64. In a preferred embodiment, as illustrated in FIG. 2, the air enters the chamber section at an acute angle with side wall 70 and it leaves the chamber section at an opposite acute angle therewith. Between these two points, the air passes in a rather turbulent way between the various exhaust carrying tubes 84, as indicated by the arrows 93, where it is heated to a temperature which will of course depend on the temperature of the exhaust fumes and the speed at which the air passes through the chamber.

As stated previously, preheated air stream 42 eventually passes through valve 26 and mixing chamber 46 where it is mixed with liquid gasoline fuel 52. This mixing chamber is shown in detail in FIG. 3 along with fuel metering assembly 54. As illustrated there, the mixing chamber itself merely comprises an enlarged section of tubing which carries the preheated air stream as indicated by subsection 44 and the combination air and liquid gasoline fuel as indicated by subsection 47. In this regard, it should be noted that an opening 94 extends into this tubing section, that is, into the mixing chamber for passing solid fuel therein from fuel divert valve 48, so long as this latter valve is not energized.

Figure 3:
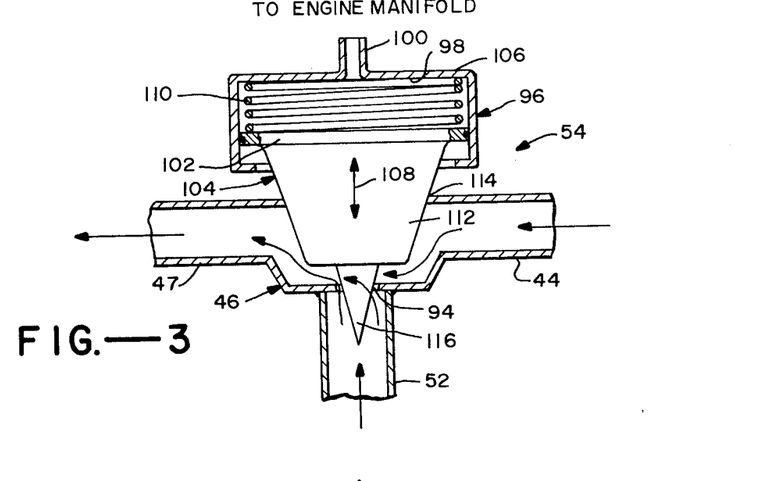
FIG. 3 is a diagrammatic illustration, in vertical section, of an assembly which comprises part of the system illustrated in FIG. 1 and which is provided for metering liquid gasoline into a stream of temperature controlled air.

In a preferred embodiment, metering assembly 54 serves to meter a predetermined amount of fuel into the mixing chamber depending upon the vacuum level at the intake manifold of engine 12. In actual practice, this metering assembly merely limits the amount of solid fuel which is drawn into the preheated air stream as illustrated in FIG. 3. In order to accomplish this, assembly 54 includes a support housing 96 defining an inner chamber 98 which is in communication with the intake manifold of engine 12 and hence its vacuum through a suitable conduit 100. The top end section 102 of a valve member 104 is mounted within chamber 98 in slidably sealed engagement with the inner wall of housing 96. In this way, the overall valve member is slidably movable within the chamber towards and away from the top end 106 of the housing, as indicated by arrow 108. As seen in FIG. 3, this member is biased in its lowermost position by a spring member 110 within chamber 96 between the top end of member 104 and top end 106 of housing 96. However, this spring is selected so that member 104 remains in its lowermost position so long as the vacuum level developed in the intake manifold of engine 12 is below a certain level. Above this level, a vacuum draws member 104 towards top section 106 a distance proportionate thereto.

As stated above, the top section 102 of valve member 104 is movable mounted within chamber 98. This valve member also includes a bottom section 112 which extends into mixing chamber 46 through an opening 114 located opposite opening 94. Suitable seal means (not shown) is provided around the opening for sealing the latter while, at the same time, allowing section 112 to move therethrough. A tapered valve seat 116 depends from the bottom of section 112 and into opening 94, as seen in FIG. 3. This valve seat is designed to completely close opening 94 when valve member 104 is in its lowermost position and provides a maximum opening when the valve member is in its upwardmost position. The opening 94 varies in size between these extremes depending upon the position of valve member 104 between its lowermost and upwardmost positions. Since the position of valve member 104 depends on the vacuum level at the intake manifold of engine 12, the size of opening 94 also depends upon this level and, hence, the amount of liquid fuel passing therethrough.

From an operational standpoint, when engine 12 is not running or there is no demand on the engine, there is little if any vacuum developed in its intake manifold. Accordingly, the valve member 104 is in its lowermost position and opening 94 is closed by valve seat 116. At the same time, there is no air stream passing through the mixing chamber since the presence of such a stream is also dependent upon a vacuum within the intake manifold.

However, as the engine runs and develops a vacuum, the previously described preheated air stream is produced, at a rate depending upon the level of vacuum and, at the same time, valve seat 116 is pulled up providing opening 94 in an amount which is also dependent on the vacuum level. This of course causes liquid fuel to be drawn into the air stream. In this regard, assembly 54 and mixing chamber 46 can be readily designed so that the mixture of air and liquid fuel leaving the chamber as stream 47 is in the precise proportion required by engine 12. With greater demands on the engine there will be a greater supply of air and fuel and with less demand there will be less air and fuel.

Figure 4:
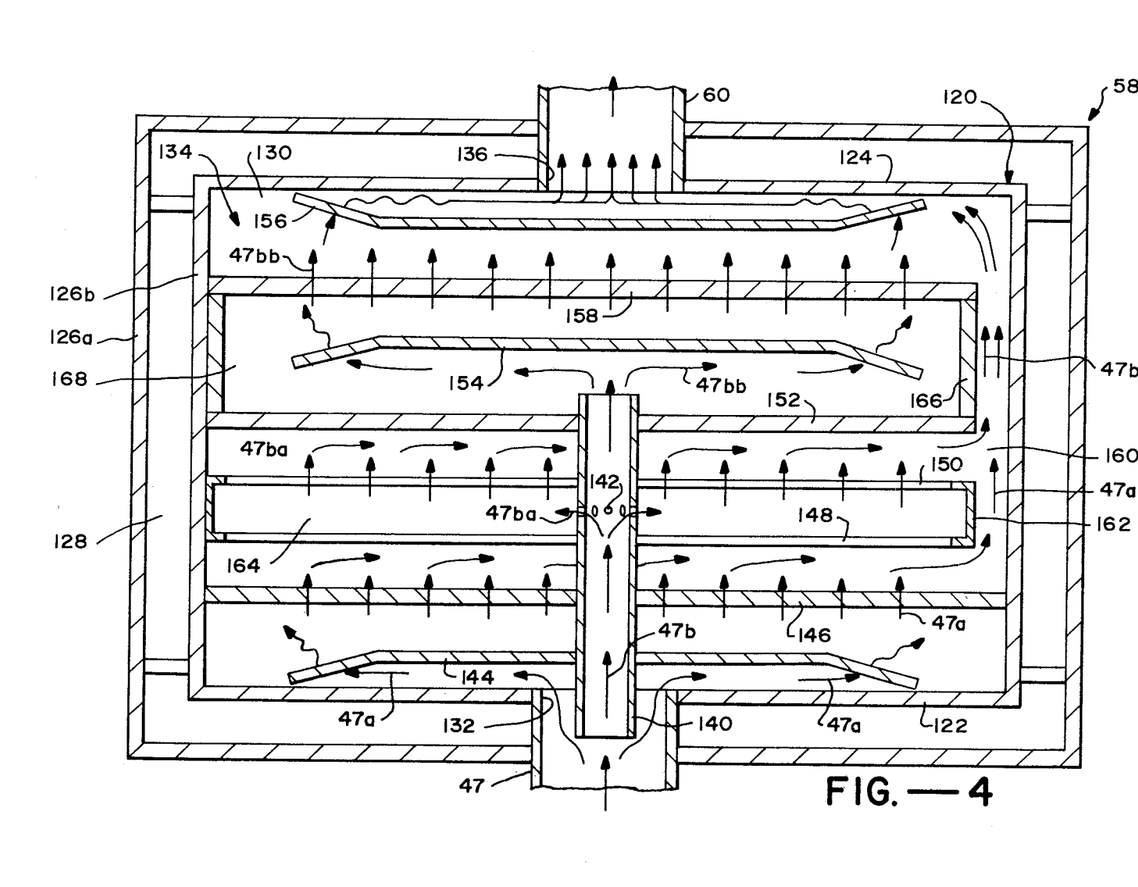
FIG. 4 is a diagrammatic illustration, in cross-section, of an assembly which comprises part of the system illustrated in FIG. 1 and which is provided for vaporizing liquid fuel in the stream illustrated in FIG. 3.

The last specific component of system 10 which will be described is vapor box 58 which is shown in detail in FIGS. 4-7. As seen in FIG. 4, the vapor box includes an overall housing 120 having a single wall front end 122 and a spaced apart, confronting single wall back end 124. For reasons to be discussed hereinafter, housing 120 is provided with concentric walls, outer walls 126a and inner walls 126b which interconnect all but the top wall (not shown) and which together define an outer water circulating chamber 128. The housing itself defines an inner chamber 130 which receives the previously described stream 47 of preheated air and liquid gasoline fuel through a centrally located opening 132 through front end 122. As will be seen below, this stream passes through chamber 130 where it is acted upon by a subassembly 134 which comprises part of the overall vapor box and which is located entirely within chamber 130. As will be seen below, this subassembly serves to reduce the liquid gasoline fuel within stream 47 to a vapor. After this has been accomplished, the combination preheated air and vapor passes out of chamber 130 as stream 60 through a central opening 136 in back end 124 of housing 120.

As seen in FIG. 4, subassembly 134 includes a centermost, longitudinally extending metal tube 140 which is located within chamber 130 but which extends partially into inlet opening 132, as seen in FIG. 4. For reasons to be discussed below, this open ended tube includes a plurality of circumferentially spaced apertures 142 which are located in a common plane normal to the axis of the tube at a point closer to the back end than to its front end. As also seen in FIG. 4, this tube supports a circulation fin 144, a vaporization plate 146 and a solid baffle plate 148 on the forward (right) side of the apertures 142. A second vaporization plate 150 is supported around tube 140 on the other side of apertures 142 along with a second solid baffle plate 152. This circulation fin, the vaporization plates and baffles all comprise part of the subassembly 134 along with second and third circulation fins 154 and 156 and a third vaporization plate 158. From FIG. 4, it can be seen that these last-mentioned fins and vaporization plates are located beyond the back end of tube 140 but in confronting relationship therewith. It can also be seen from this figure that the vaporization plates and solid baffles rest against the bottom of chamber 134 and may be welded or otherwise suitably connected with the inner side wall 126b. However, these plates do not extend the entire height of chamber 134 but stop short thereof so as to define a top passage 160. Moreover, the first baffle plate 148 is interconnected to the second vaporization plate by a continuous outer circumferential rim 162. As a result, an inner chamber 164 is provided between the two interconnected plates and incorporates the previously described apertures 142. In a similar way, the second baffle plate 152 is interconnected with the last vaporization plate 168, by means of continuous circumferential rim 166, thereby providing an inner chamber 168 therebetween. As illustrated in FIG. 4, this latter chamber incorporates previously recited circulation fin 154. While it is not shown exactly how this latter fin and fin 156 are held in position, it is to be understood that any suitable means may be provided such as extensions connecting these fins to a side wall or to the next adjacent component.

Before describing the way in which subassembly 134 functions to vaporize the liquid gasoline fuel entering chamber 130, attention is directed to the details of the circulation fins and vaporization plates. Only one of these fins, specifically fin 144, is shown in detail (FIGS. 5 and 5a) and only one of the vaporization plates, specifically plate 146, is shown in detail (FIGS. 6 and 7). Turning specifically to FIGS. 5 and 5a, circulation fin 144 is shown somewhat rectangular in outer periphery, although as illustrated in FIG. 4, it includes an outer circumferential portion 144a which is bent outwardly relative to the rather planar central section 144b which includes a central opening 144c for receiving previously described tube 140. As seen best in FIG. 5c in conjunction with FIG. 5, portion 144 includes circumferentially spaced slits extending inwardly at acute angles from their outer edge so as to define what may be referred to as tabs 169. These tabs are bent back relative to one another as seen in FIG. 5a so as to define angled spaces 170 between adjacent tabs. These spaces serve to circulate the air and liquid gasoline passing therethrough, as indicated by arrows 172. The other two circulation fins 154 and 156 may be identical to fin 144 but may or may not include a central opening depending on whether one is needed for support.

Turning now to FIGS. 6 and 7, attention is directed to vaporization plate 146. As seen in these figures, this plate includes a vaporization member 174 in the form of a single pleated fabric having vertically spaced pleat lines. This fabric is one which supports vaporization by being sufficiently porous to allow the preheated air stream to pass therethrough while, at the same time, collecting at least a portion if not all of the liquid gasoline fuel in the stream thereon for vaporization. As this fuel evaporates, it is carried with the air stream through the fabric. This pleated fabric is held in place by rigid frame 176 constructed of a rigid rubber or metal. The pleats in member 174 are reinforced in two ways. First, before the fabric is pleated, it is laminated on its front size with a more rigid plastic screening indicated generally at 178 and the two are then pleated. This laminated reinforcing screen serves to help prevent the pleats making up member 174 from buckling laterally, that is, towards the sides of the overall plate member. A second reinforcing means is comprised of a separate relatively planar reinforcement screen 180 which is constructed of a material more rigid than the pleated member itself. This screen 180 extends across and in contact with the back side of the pleated member and is held in place by the frame 176. This latter screen serves to prevent the pleated member from buckling in the rearward direction. Finally, a central opening 182 is provided between the pleated member and its reinforcing means for receiving previously recited tube 140.

Having described vaporization plate 146, it is to be understood that the other vaporization plates may be identical, except that plate 158 may not require a central opening similar to opening 182. The remaining components making up subassembly 134, specifically the two baffle plates 148 and 152 will not be described in detail. It should suffice to say that there are solid plates which prevent the passage of the combination air and fuel stream and are preferably constructed of stainless steel.

Having described overall vapor box 58 from a structural standpoint, attention is now directed to the way in which it operates to convert incoming stream 47 which carries liquid gasoline to stream 60 which carries gasoline vapor. Returning to FIG. 4, it can be seen that initial stream 47 enters the vapor box at inlet 132. A portion of this stream generally indicated by arrows 47a enters chamber 130 outside tube 140. This stream portion is caused to circulate past the first fin 144 by its outer tabs 169 and thereafter into and through the first vaporization plate 146 as indicated by the additional arrows 47a. As this occurs, the liquid gasoline fuel within the stream is vaporized and also carried through the vaporization plate. This combination of air and gasoline vapors is caused to move up and into the space 160 by the first baffle plate 148, again as indicated by the arrows 47a. Following these arrows, it can be seen that this stream eventually passes across the last circulation fin 156 where it is circulated and eventually passes out of the vapor box through outlet 136, as part of the overall stream 60.

The remainder of stream 47 entering the vapor box through inlet 132, indicated benerally by arrows 47b, passes into tube 140. A part of this stream portion passes through apertures 142 and into the air space 164. This stream part is indicated by the arrows 47ba. This part of the stream passes through the second vaporization plate so that its liquid gas is caused to vaporize and also pass therethrough. This combination of preheated air and gasoline vapor is caused to move up into space 160 by the second baffle plate 152 and follows the same path as stream portion 47a to outlet 136 so as to form part of the outlet stream 60.

The remainder of stream portion 47b passes out of the back end of tube 140 as indicated by the arrows 47bb. This stream portion is caused to circulate by fin 154 and thereafter passes through the last vaporization plate causing the liquid gasoline therein to vaporize and also pass therethrough. This combination of preheated air and vaporized gasoline joins the other two portions 47a and 47ba after being circulated by the last fin, thereby completing the outlet stream 60.

From the foregoing, it can be seen that the liquid gasoline initially in stream 47 is vaporized without the direct application of heat, as described in one of the previously recited co-pending applications. However, like one assembly disclosed in one of those applications, it is quite desirable to prevent the vaporization chamber from freezing. As a result, the previously described outer chamber 128 defined between the concentric walls 126a and 126b is adapted for insertion in line with the hot water system of engine 12 as indicated by the two arrows 190 in FIG. 1. More specifically, the circulating water from the engine along its hot section is passed through chamber 128 by an appropriate inlet and an appropriate outlet (not shown). In this regard, it is the heat from this water that is sensed by the previously described temperature sensor 56.

What is claimed is:

1. A system for feeding gasoline fuel into a gasoline burning combustion engine, said system comprising: means for supplying gasoline fuel in a liquid state from a supply tank to a vaporization chamber; means for providing a stream of preheated air and directing said preheated air into said vaporization chamber; means including said vaporization chamber for vaporizing said liquid gasoline in said chamber whereby the vaporized gasoline and said preheated air combine within said chamber; and means for directing said combination of vaporized gasoline and preheated air to said engine, whereby said preheated air prevents said vaporized gasoline from condensing to a liquid state before reaching said engine, said vaporizing means including a housing defining said vaporization chamber therein and including means for receiving said stream of preheated air and liquid gasoline and directing said stream into said chamber, a plurality of vaporization plates, each including a member located within said chamber and having a front and back side and means for directing a portion of said stream entering said chamber onto the front side of one of said members and a portion of said entering stream onto the front side of a second one of said members, whereby at least some of the liquid gasoline impinging on the front side of each of said members is vaporized and carried through the member by said preheated air.

2. A system according to claim 1 wherein said gasoline burning combustion engine produces hot exhaust fumes during operation thereof and wherein said preheated air providing and directing means includes means utilizing the heat from said hot exhaust fumes for preheating said air.

3. A system according to claim 2 wherein said preheated air providing and directing means includes means for providing two air-flow paths, only one of which is preheated and means for combining the two flow paths in a controlled way for controlling the temperature of said air.

4. A system according to claim 1 wherein each of said vaporization plates includes said member, means for supporting said member in a pleated fashion and means for reinforcing said pleated member against both lateral and rearward deformation.

5. A system according to claim 4 wherein said reinforcing means includes a reinforcement screen laminated to the front face of said pleated member for reinforcing the latter laterally and a planar screen extending along against the back side of said pleated member for reinforcing the member rearwardly.

6. A system according to claim 5 wherein said gasoline burning combustion engine includes an intake manifold and carburetor and wherein said liquid gasoline fuel supply means includes means for metering said liquid fuel into said mixing chamber, in amounts dependent upon the vacuum level in the intake manifold of said engine and wherein said means for directing said combination includes means for directing said combination directly into said intake manifold in amounts also depending upon the vacuum level of said manifold, whereby the amount of vaporized gasoline directed into said engine is proportionate to the amount of liquid gasoline directed into said mixing chamber at any given time.

7. A system for feeding gasoline fuel into a gasoline burning combustion engine which produces hot exhaust fumes during operation thereof and which includes an intake manifold and carburetor, said system comprising: means for alternatively supplying gasoline fuel in a liquid state from a supply tank directly to said carburetor or to a mixing chamber; a housing defining said mixing chamber; means for providing a stream of air preheated to within a controlled predetermined temperature range and for directing said preheated air into said mixing chamber, said heat providing and directing means including means for providing a flow of ambient air, utilizing the heat from said hot exhaust fumes for preheating at least a portion of said flow of air, said liquid gasoline and preheated air combining within said mixing chamber; means for directing said combination stream into a vaporization chamber; means including said vaporization chamber for vaporizing said liquid gasoline in said chamber whereby the vaporized gasoline and said preheated air combine within said vaporization chamber, said vaporizing means including a housing defining said vaporization chamber therein and including means for receiving said stream of preheated air and liquid gasoline and directing said stream into said chamber, a plurality of vaporization plates, each including a member having a predetermined porisity to air located within said chamber and having a front and back side, and means for directing a portion of said stream entering said chamber onto the front side of one of said members and a portion of said entering stream onto the front side of said second member, whereby at least some of the liquid gasoline impinging on the front side of each of said member is vaporized and carried through the member by said air in said stream; and means for directing said combination of vaporized gasoline and preheated air to said engine, whereby said preheated air prevents said vaporized gasoline for condensing to a liquid state before reaching said engine.

8. A system according to claim 7 wherein said liquid gasoline fuel supplying means includes means for metering said liquid fuel into said mixing chamber in amounts dependent upon the vacuum level in the intake manifold of said engine and wherein said means for directing said combination of vaporized gasoline and preheated air to said engine includes means for directing said combination directly into said intake manifold in amounts also dependent upon the vacuum level in said manifold whereby the amount of vaporized gasoline directed into said engine is proportionate to the amount of liquid gasoline directed into said mixing chamber at any given time.

9. A system according to claim 7 wherein said air stream is preheated to a temperature between 150° F. and 180° F.

* * * * *